United States Patent [19]

Detering

[11] 4,389,606
[45] Jun. 21, 1983

[54] AUTOMATICALLY SYNCHRONIZED SYNCHRONOUS MOTOR DRIVE SYSTEM

[75] Inventor: Richard L. Detering, Seattle, Wash.

[73] Assignee: Westinghouse Electric Corp., Pittsburgh, Pa.

[21] Appl. No.: 228,643

[22] Filed: Jan. 26, 1981

[51] Int. Cl.³ .............................................. H02P 7/36
[52] U.S. Cl. ................................... 318/712; 318/721; 318/807
[58] Field of Search ................ 318/712, 705, 714–721, 318/723, 798–803, 807, 809

[56] References Cited

U.S. PATENT DOCUMENTS

| | | | |
|---|---|---|---|
| 4,028,609 | 6/1977 | Detering | 321/5 |
| 4,125,796 | 11/1978 | Nagase et al. | 318/175 |
| 4,173,722 | 11/1979 | Detering | 307/252 |
| 4,295,085 | 10/1981 | Lafuze | 318/721 |
| 4,329,636 | 5/1982 | Uchida et al. | 318/721 |

OTHER PUBLICATIONS

Slemon et al.; "Controlled-Power-Angle Synchronous Motor Inverter Drive System," Mar./Apr., 1973, IEEE Transactions, vol. IA-9, No. 2, pp. 216–219.

Moffat et al., "Digital Phase-Locked Loop for Induction Motor Speed Control," Mar./Apr., 1979, IEEE Transactions, vol. IA-15, No. 2, pp. 176–182.

Primary Examiner—J. V. Truhe
Assistant Examiner—Patrick C. Keane
Attorney, Agent, or Firm—C. M. Lorin

[57] ABSTRACT

In a current-fed static controlled synchronous motor drive which includes a ramp logic for establishing the desired firing retardation for the naturally commutated thyristors, an optical encoder provides a position signal and a velocity signal, while the ramp counting the velocity pulses is automatically aligned with the position signal by means of a phase detector causing either to add pulses from a local oscillator or to inhibit velocity pulses so as to compensate for a phase error in either direction. Alignment is also provided within 60° initially by presetting the ramp counting in relation to a digital representation of sine 60° time intervals over a fundamental cycle.

9 Claims, 7 Drawing Figures

AUTOMATICALLY SYNCHRONIZED SYNCHRONOUS MOTOR DRIVE SYSTEM

BACKGROUND OF THE INVENTION

This invention relates to current-fed static-controlled synchronous motor drives in general, and more particularly to alignment and synchronization of inverter gate pulse control with synchronous motor operation in such a motor drive.

In contrast to the voltage-fed type, in a current-fed motor drive system the amplitude and the frequency of the alternating current that excites the stator windings of the motor are the control parameters. Typically, the motor is energized by an inverter formed of a plurality of controllable electric valves or switching devices (e.g., thyristors) of the type having the ability to hold "off" forward voltage until turned "on" by a pulse from a gate pulse generator. The amplitude of alternating current supplied to the motor can be regulated or controlled as desired by adjusting the average magnitude of voltage impressed on the DC side of the inverter, while the frequency of the current is controlled by appropriately varying the switching frequency of the thyristors of the inverter.

A variable speed motor drive involves frequency adjustment of the power supply to the motor in order to regulate speed. In such a motor drive, gating of the static switches which determine the power supply parameters must be operable through a range extending down to zero motor speed. In a system embodying thyristors which are naturally commutated, the firing angle of the thyristors is controlled by reference to a time wave related to the voltage applied to the main electrodes of the thyristor to be turned "on", at any given moment. The generation of such a time wave reference is disclosed, typically, in U.S. Pat Nos. 4,173,722 and 4,028,609 of R. L. Detering. There, a digital pulse generator uses a digital counter synchronized in phase and frequency with the fundamental voltage sine wave, and the time wave reference required for firing angle control is derived from the digital counter.

When the motor drive includes a synchronous motor supplied by an inverter, variable speed control through firing angle adjustment of the inverter thyristor is directly related through the time wave reference to the voltage and frequency parameters of the rotating vector derived on the stator, or the rotor of the machine, since there is an inherent synchronism between the two under steady conditions of operation. Accordingly, it has been proposed to use the motor terminal voltage to synchronize the inverter triggering pulses. See H. Le-Huy, A. Jakubowicz and P. Perret, "A Self-Controlled Synchronous Motor Drive Using Terminal Voltage-Sensing," in 1980 IEEE, pp. 562–569. There, the polarity and zero-crossings of the machine voltages are detected by means of terminal sensors from which is derived a speed signal as well as a rotor position signal. Although this prior art technique has been intended to be used as part of a microprocessor-based control system, it lacks the advantage of an all-digital treatment of the information. In particular, it does not address itself specifically to the problem of initializing and synchronizing thyristor control with the operation of the synchronous motor drive to reach synchronism.

It has also been proposed in the prior art to stabilize the operation of adjustable speed synchronous motor drives through the use of a rotor position sensor coupled to the shaft of the synchronous motor for monitoring angular positions of the rotor. The position sensor provides an indication of the zero-crossings of the alternating voltage applied to the stator windings. Accordingly, the rotor position sensor is used to command cyclic firing of the inverter thyristors in synchronism with rotor speed. See Slemon, Forsythe and Dewan, "Controlled-Power-Angle Synchronous Motor Inverter Drive System," in IEEE Transactions, Volume IA-9, pp. 216–219, March/April 1973. These authors, however, do not take into consideration the problem of alignment and synchronization, and the means discussed do not lend themselves to microprocessor-based treatment. This problem, however, has been considered by Dewan and Forsythe in IEEE Transactions on Industrial Electronics and Control Instrumentation, Vol. CI-16 No. 1, July 1969, and an analog solution to this problem is proposed there.

It is also known from Moffat, Sen, Younker and Bayoumi "Digital Phase-Locked Loop for Induction Motor Speed Control," in 1979 IEEE, pp. 176–182, Vol. IA-15 No. 2, March/April 1979, to control the speed of a thyristor-controlled motor by reference to a speed signal derived from a transducer in the form of a digital optical encoder. The digital pulse generator disclosed in this publication includes a phase-locked loop like in the aforementioned Detering patents. The article, however, does not deal with the problem concerned here because an induction motor, not a synchronous motor is involved.

An object of the present invention is to eliminate altogether the combination of a phase-locked loop and a local voltage-controlled oscillator by taking advantage of a position transducer attached to the shaft of the motor, thereby simplifying the gating system and extending its operation down to zero speed.

Microprocessor control of a current-fed synchronous motor drive is known in which synchronization of thyristor control with the rotor position is effected using an optical encoder to produce speed and phase position signals, see H. Le-Huy, R. Perret and D. Roye "Microprocessor Control of a Current-fed Synchronous Motor Drive", IEEE/IAS Conference Record, pp. 873–880, 1979. The synchronous motor drive system of this prior art, however, does not use the ramp logic technique of the aforementioned Detering patents, and therefore has a quite different approach to synchronization.

Another object of the present invention is to enable by digital processing automatic alignment and synchronization of inverter thyristor gate control with motor operation in a synchronous motor static-controlled drive system.

A further object of the present invention is to provide microprocessor-based and all-digital monitoring and control of a synchronous motor drive system.

SUMMARY OF THE INVENTION

In a gating system of a conventional thyristor converter having a phase-locked loop is used for synchronizing to the AC power source the time wave reference derived from a digital counter. According to the present invention, the conventional voltage-controlled oscillator of a phase-locked loop is replaced by a position transducer attached to the rotor of a synchronous motor thereby providing inherent synchronization through the synchronous motor drive at all speeds down to zero. A local oscillator is used to add pulses, or inhibit velocity pulses from the position transducer, in order to achieve synchronization when starting the motor. The position transducer also provides a digital indication of rotor position when the motor is at rest, and such digital indication is used to align the digital counter by presetting, before starting the motor.

DESCRIPTION OF THE PREFERRED EMBODIMENT

For the purpose of the instant disclosure of the invention, U.S. Pat. No. 4,028,604 and No. 4,173,722 of Richard L. Detering are incorporated by reference since they disclose a digital pulse generator which is directly usable for the implementation of the method and apparatus according to the present invention.

The article by Moffat, Sen, Younker and Bayoumi in 1979 IEEE, pp. 176–182, Vol. IA-15 No. 2, March/April 1979, is also incorporated by reference. This article does not involve a synchronous motor, but rather an induction motor, however, the incorporation by reference is made on account of the disclosure therein of a rotating machine using variable frequency excitation supply controlled by thyristor and a digital optical encoder coupled to the rotor of the motor for automatic adjustment to speed of the firing of the inverter thyristors in the control loop.

In a thyristor-controlled synchronous motor drive the present invention combines (a) a digital pulse generator used for controlling the thyristor firing angle in accordance with a time wave reference simulating the power supply naturally commutating the thyristors, and (b) a method and an apparatus for digitally aligning and synchronizing the time wave reference with the fundamental wave of the power supply.

The synchronization method according to the invention comprises the steps of: establishing in relation to rotor positions a succession of digital states characterizing successive phase relationships of the phase lines of the motor as if the motor were running; simulating, with a local oscillator generating a first series of pulses, a fictive velocity signal as if the motor were running at said fictive velocity; reading an initial one of said successive digital states corresponding to a present position of said rotor when the motor is not running; presetting an initial count defined by said initial digital state; deriving from the rotor a second series of pulses indicative of the speed of the motor when the motor is running and simultaneously scanning through said successive states to indicate zero-crossings of the fundamental sine wave related to a thyristor "next" to be fired; recurrently counting pulses of said second series; detecting a phase error between the occurrence of said zero-crossing and each recurrent counting of said second series of pulses; modifying said recurrent counting to compensate for said phase error, thereby to synchronize recurrent counting with said zero-crossing of said fundamental sine wave; and controlling the firing of the thyristors in succession by reference to such modified recurrent counting.

The invention also resides in a variable speed synchronous motor drive system including a current-fed inverter having thyristors controlled to be turned ON under natural commutation by a variable frequency AC power voltage, comprising: transducer means coupled to the rotor of the motor for providing a signal indicative of rotor position relative to the stator of the motor; means associated with said rotor for deriving an actual velocity signal characteristic of motor speed; counter means controlled by said velocity signal deriving means and locked with said transducer means for generating a time wave reference; a comparator for establishing with said time wave reference a selected firing angle; a gate pulse generator responsive to said comparator for selectively applying a firing pulse to a thyristor "NEXT" to be turned "on" in a sequential order of said thyristors.

The invention generally provides a synchronous motor drive system means responsive to the counter means and to rotor position signal for locking the counter means with the transducer means when the motor rotates.

The locker means includes phase detector means for detecting a phase error between the time wave from the counter means and the rotor position signal, and the time wave is automatically shifted to compensate for such phase error and to lock said time wave into synchronism with the position signal. In this situation, a phase-locked loop is provided including the rotor of the motor. Once locked-in, the system remains in synchronism due to the inherent quality of the synchronous motor.

Figure 1:
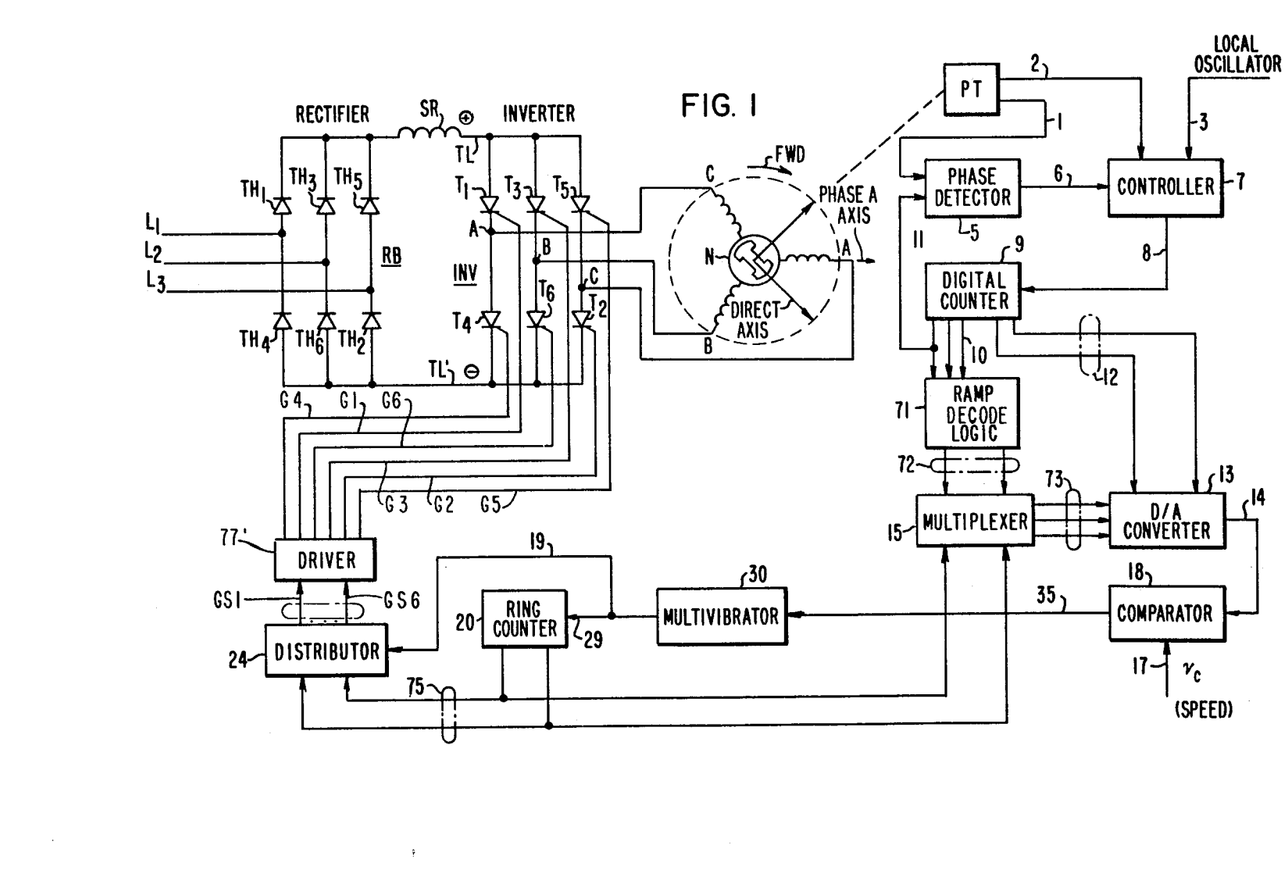
FIG. 1 is a schematic representation of the synchronous motor drive system according to the present invention.

Referring to FIG. 1, a synchronous motor drive system is shown to include: a rectifier thyristor bridge RB supplied with AC voltage from lines $L_1$, $L_2$, $L_3$; a DC link interconnecting the rectifier bridge to an inverter bridge INV via terminal lines TL, TL' and a smoothing reactor SR. Illustratively, each bridge has six thyristors connected across three phases. Thus, thyristors $TH_1$–$TH_6$ of bridge RB relate to lines $L_1$, $L_2$, $L_3$, and thyristors $T_1$–$T_6$ of bridge INV relate to phase lines A, B, C of the stator of the motor. Thyristors $T_1$–$T_6$ are gated by a driver circuit 77' including circuit amplifier, pulse former and isolation transformer. The drive circuit addresses the thyristors in sequence and applies successive gate pulses $G_1$–$G_6$ to the control electrodes. The thyristor "next" in sequence is fired while a conducting thyristor is being turned "OFF" by natural commutation from phase lines A, B, C. At any given time two thyristors under opposite polarities are conducting across the stator windings of the motor. Upon commutation, one thyristor of a pair is extinguished and another thyristor is turned "ON" by the incoming gate pulse $G_1 \ldots$, or $G_6$. This is the well-known current-fed inverter supply of a motor drive. The driver circuit is controlled by the logic of a distributor 24 actuated by a ring counter 20 which determines the timing and order of control signals $GS_1$–$GS_6$ on lines 28 and of triggering gate pulses $G_1$–$G_6$ to the thyristors $T_1$–$T_6$.

In a synchronous motor drive the rotating vectors of the rotor and the stator are aligned so that the switching frequency of thyristors $T_1$–$T_6$ exactly matches the speed of the motor. Therefore, thyristor control by distributor 24 must match in phase and frequency the vector relationship between motor stator and rotor. Accordingly, the circuit of FIG. 1 is an adaptation of the basic circuit disclosed in the aforementioned Detering patents whereby thyristor control and motor operation are coordinated in time for synchronization. Once synchronization has been reached, the system inherently maintains itself at all speeds since synchronization is now achieved with the velocity signal.

Mounted on the shaft of the rotor is a position sensor PT from which are derived a rotor position signal having transitions at the period of the phase current of curve (a) and a pulse train having a frequency indicative of the rpm of the rotor, or speed of the motor. The position signal is outputted on line 2 and the velocity signal on line 1 of the circuit of FIG. 1.

Figure 2:
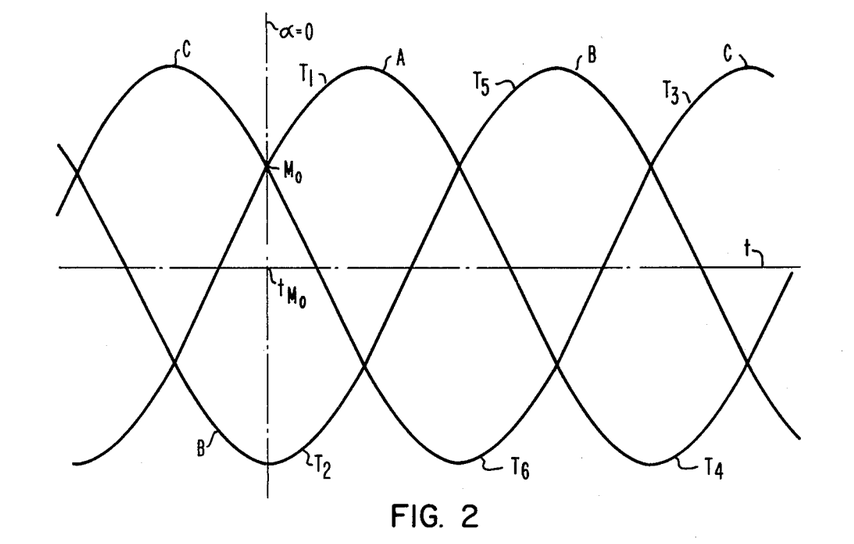
FIG. 2 illustrates with curves the phase line voltages applied to the main electrodes of the thyristors of the inverter supplying the armature current to the synchronous motor of the drive system of FIG. 1.

Referring to FIG. 2, curves A, B and C respectively represent the phase-to-neutral voltages $V_{AN}$, $V_{BN}$, $V_{CN}$ related on the stator of the motor to phases A, B and C. Point $M_o$ where phase voltage curves C (for voltage $V_{CN}$) and A (for voltage $V_{AN}$) have the same amplitude represents for a firing angle $\alpha=0$ the instant in time when voltage $V_{AN}$ becomes larger than voltage $V_{CN}$, e.g., when there is an opportunity to fire thyristor $T_1$ (see FIG. 1) under natural commutation. This situation appears also from the vectorial representation of $V_{AN}$, $V_{BN}$, $V_{CN}$ of FIG. 3, where the three vectors have a common origin at the neutral potential point N (see FIG. 1). The interphase voltage $V_{CA}$ is shown at 150° from vector $V_{AN}$.

Figure 3:
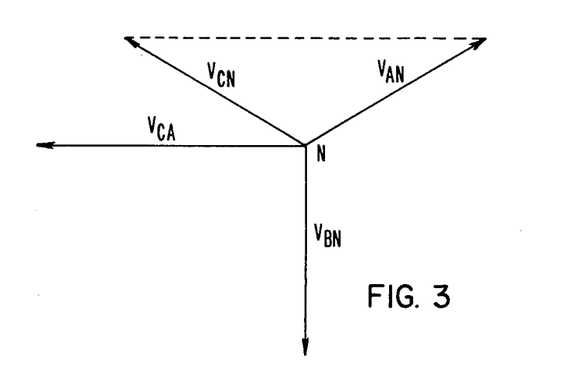
FIG. 3 is a vectorial representation of the phase-to-neutral and interphase voltages in relation to FIG. 2.
Figure 4:
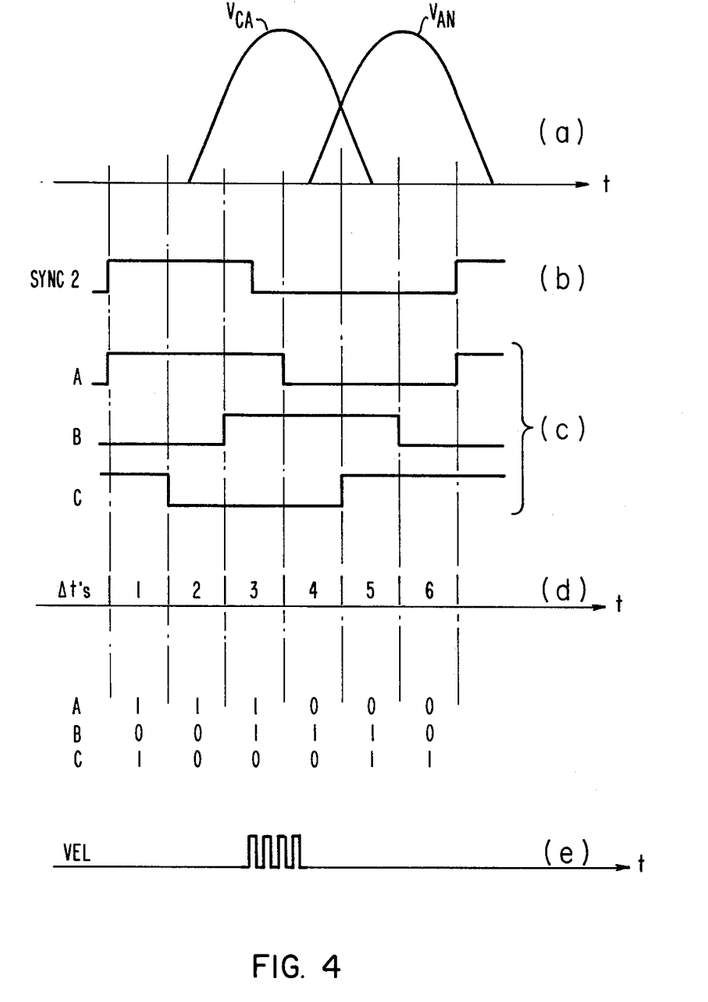
FIG. 4 illustrates with curves the time relation between the position signals and the counting recurrences in the ramp logic of the system of FIG. 1.

As shown by curves (a) of FIG. 4, the stator generates voltage such as $V_{CA}$ and $V_{AN}$. Position transducer PT generates three rotor position indicative signals A, B, C such as shown by curves (c) of FIG. 4. Vectors $V_{CA}$ and $V_{AN}$ of FIG. 3 illustrate for the direction of rotation shown, the critical instant at which thyristor $T_1$ will become "next" to be fired for $\alpha=0$, e.g., when $V_{AN}$ in projection exceeds $V_{CN}$ for natural commutation as indicated by $t_{mo}$ in FIG. 2. Curve (b) of FIG. 4 shows signal SYNC 2 derived on line 11 from digital counter 9. Curves (c) are rectangular signals A, B, C having rising edges at 120° to one another, which are rotor position signals representing the three phases $V_{AN}$, $V_{BN}$, $V_{CN}$ of the motor. Digitally, these three signals define six successive time intervals $\Delta t_1$–$\Delta t_6$ which, counting from the signal A transition, are identified as (101), (100), (110), (010), (011), (001), respectively. Initially, assuming thyristor $T_1$ is "next" to commutate when $V_{CA}$, the commutating voltage, has its zero-crossing, the optical encoder of the position transducer is oriented and aligned so that there exists between the transition of A, the synchronizing phase, and the $V_{CA}$ zero-crossing a phase shift like that illustrated in FIG. 4 between curves (a) and (c), namely 75° in the illustration given. Curves (a), (b) and (c) show the curve relationship when the synchronous motor is running at no load. Then, signal SYNC 2 has a transition which is synchronous with the transition of position signal A. The velocity signal shown in curve (e) is also derived by position transducer PT. Depending on speed, curves (b), (c) and (e) are occurring faster, or slower, within the time frame and without any change in their relative position.

In the firing control process, under natural commutation, signals B, C and A are at 120° from each other in this order, in accord with the initial position of vector $V_{AN}$ in FIG. 3 for thyristor $T_1$. After thyristor $T_1$ has become conductive, $T_6$ continues to conduct until $T_2$ takes over, e.g., just before $V_{CN}$ becomes more negative than $V_{BN}$ (FIG. 2). And so on for $T_3$ in the positive polarity, $T_4$ in the negative polarity, $T_5$ in the positive polarity and $T_6$ in the negative polarity, in this order, the commutations occurring at 60° to one another.

Figure 5:
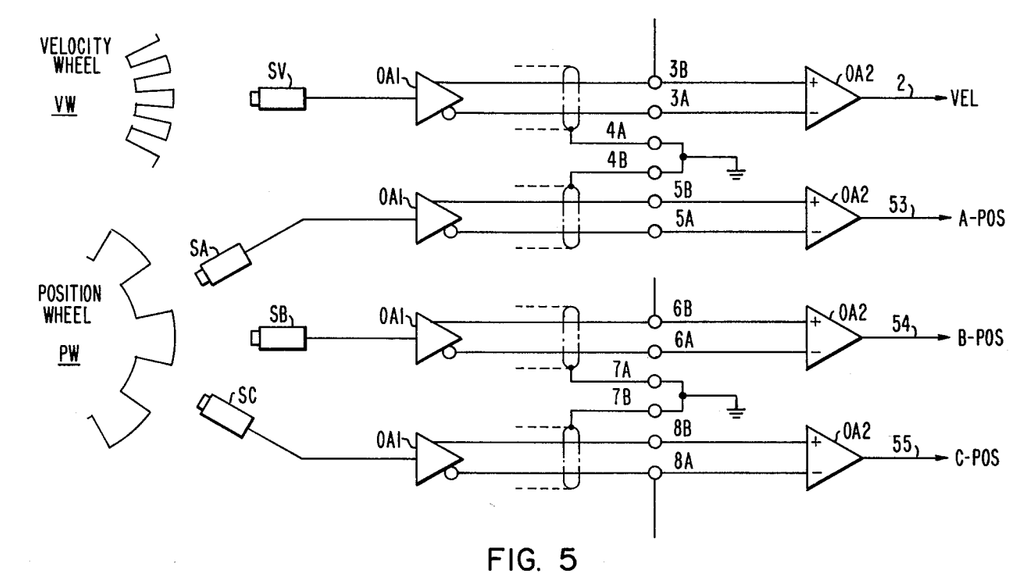
FIG. 5 schematically illustrates the derivation on the rotor with the position transducer of FIG. 1, of the position and velocity signals.

Position transducer PT is preferably an optical encoder such as used in the aforementioned Moffat article. Typically, an industrial optical incremental encoder produced by Baldwin and sold on the open market as Model 3732AS-1 is used to generate curves A, B, C. The output signals A, B, C form six possible combinations of three digital states as a ZERO or a ONE. As shown on FIG. 5 the position transducer includes a velocity wheel VW and a position wheel PW, mounted on the rotor of the motor. Sensors SV associated with the velocity wheel and SA, SB, SC for the respective phase lines, e.g., at 120° to each other. The angular displacement is defined by a particular combination of signals A, B, C derived from PT. Thus, the A position signal has a 60° shift relative to B as is apparent from the 60° angular position of SB relative to SA. The same is true for SC relative to SB. As shown in FIG. 5, after preamplification by operational amplifiers OA, one in each channel, the sensed signals are transmitted through respective cables, properly shielded and grounded to output amplifiers OA$_2$, one in each channel, providing the velocity signal (line 2 in FIG. 1) and the position signals A, B, C.

Referring again to FIG. 1, control of the firing angle of the thyristors is commanded by the comparator 18 and multivibrator 30. Control pulses are applied via distributor 24 and driver 77', the retard being by an amount given by reference voltage signal $v_c$ of line 17 to the comparator, as explained in the Detering patents. Also, the Detering patents disclose how with a phase-locked loop a digital counter, such as 9 in FIG. 1, is clocked from line 8 to generate a digital ramp on lines (10, 12). The ramp is modified by a ring-counter 20 in the order of succession of the thyristors upon the occurrence of a hard pulse generated on lines 19, 29 by multivibrator 30, thereby to form a new ramp at 60° to the preceding one. This is achieved via lines 12 to a D/A converter 13 and lines 73 from multiplexer 15 which is transferred to ring-counter 20 to its next state. The ramp decode logic circuit 71 converts logically lines 72 into lines 73. As a result, from line 12 and line 73, D/A converter 13 provides on line 14 a succession of analog ramps which are the time references upon which signal $v_c$ from line 17 establishes the firing instant of the thyristor "next" to be turned "ON".

In accordance with the present invention, instead of using a voltage controlled oscillator to automatically adjust the frequency of the clocking pulse of line 8 into counter 9 as Detering does in the aforementioned patents, the position transducer PT is now used in association with controller 7 as a phase-locked loop. The velocity signal of line 2 clocks the digital counter 9 and it is always at a frequency matching the speed of the motor, as is inherent in a synchronous machine. A problem remaining is to initialize the system and synchronize the signal of lines (10-12) from counter 9 with the position signal of line 1 before the afore-mentioned inherent synchronism can take place.

Referring to FIG. 4, as earlier stated, the three rectangular signals A, B, C exhibit six possible combinations of a high or a low magnitude. These combinations represent six time intervals $\Delta t_1$-$\Delta t_6$ of 60° duration. Therefore, when starting counter 9 the fed back signal SYNC 2 may fall in any of these time intervals. The first step before synchronizing with phase detector 5 is to determine the initial position of the rotor and align SYNC 2 so that it falls within the time interval $\Delta t_1$. The next step will be to correct any subsisting error within $\Delta t_1$, e.g. 60° when this is done the system is synchronized, phase detector 5 in order e.g. SYNC 2 is in alignment with signal A. Initialization is effected with the motor stopped, using a digital combination of A, B, C to identify the initial time interval $\Delta t_1$ ... or $\Delta t_6$. The digital representation so detected is used to preset counter 9. This can be done by parallel loading of counter 9 with the preset number before it starts counting velocity pulses from line 2 with the motor running. This approach involves, though, certain complexities in digital treatment of (A, B, C,) to obtain a preset count. It is preferred to use a shift register 52 and count so many shifting steps in accordance with the initial (ABC) combination. SYNC 2 resulting from the count of counter 9 will be shifted by so many time intervals, such as $\Delta t_1$-$\Delta t_6$, back to the desired $\Delta t_1$ time interval. Once this is done, an error may subsist which is within 60°. The velocity signal of line 2 is now derived while running the motor, and the local oscillator is coupled to line 3, so that synchronization by phase detector 5 can be effected, as explained hereinafter.

Figure 6:
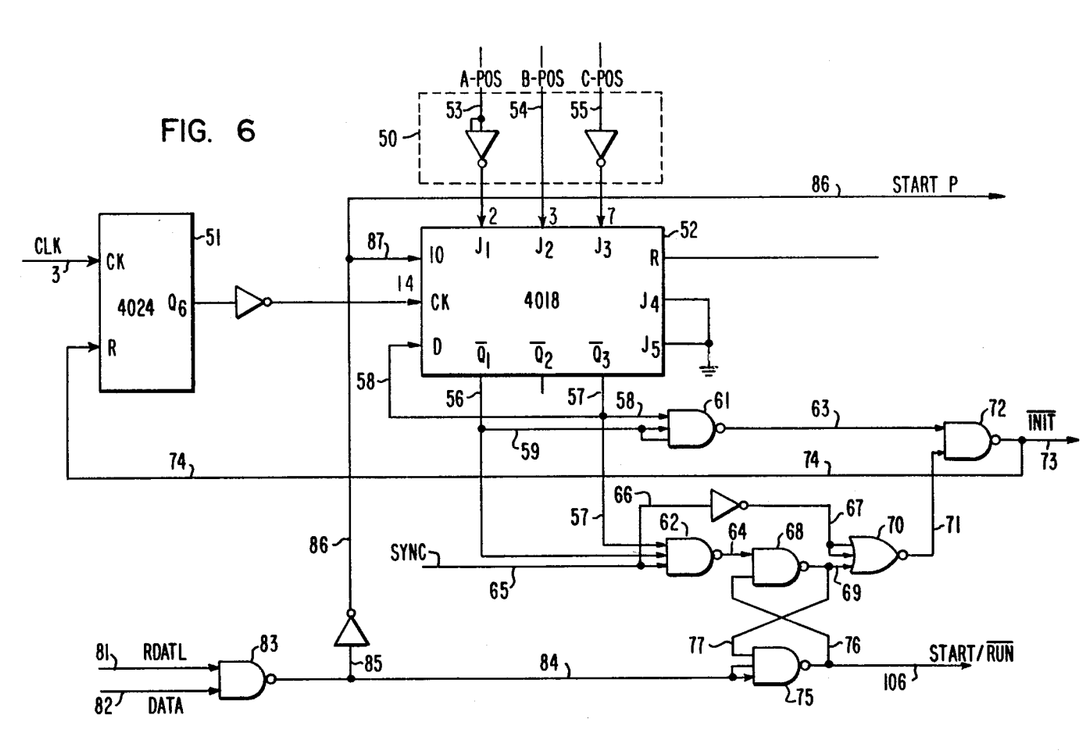
FIGS. 6 and 7 are detailed circuitry from the system of FIG. 1 as can be used for alignment and synchronization of the motor drive in accordance with the invention.

Referring to FIG. 6, the A, B, and C position signals from the position transducer are applied to three input pins of a solid-state encoder 50 used to convert the logic combination of A, B, C into A, B, C. This combination identified in FIG. 6 as states $J_1$, $J_2$, $J_3$ is applied to the input pins 2, 3 and 7 of a C-MOS solid state device 52 identified on the open market as 4018. Device 52 is clocked by a 1/N divider 51 in the form of a C-MOS solid state device known as 4024.

The three position signals A, B, C are inputted via three respective lines 53, 54, 55. Within block 50, the A and C position signals are each passed through an inverter I. Thus, $J_1$, $J_2$, $J_3$ are the three respective states A, B and C.

Device 51 is clocked by the local oscillator via line 3. It is assumed there are on line 3 (the actual velocity signal of wave (e) in FIG. 4, or the fictive velocity signal due to the local oscillator when the motor is not running) 1536 pulses within a cycle of the power supply, or of signal A, e.g., between two rising edges. If it is so, within any time interval such as $\Delta t_1$ ... or $\Delta t_6$ (e.g. 60°), there is N=1536/4×6=64 pulses, where 4 is the number of pole pairs of the machine and 6 is the number of 60° intervals in the period. Therefore, every 64 pulses the 1/N divider 51 will clock device 52, thus advancing the digital state of the combination (A, B, C) or ($J_1$, $J_2$, $J_3$) to the "next" in accordance with the following table of truth:

| INTERVAL | A | B | C | $J_1$ | $J_2$ | $J_3$ | PULSE ADVANCE | NUMBER OF $\Delta t$ INTERVALS |
|---|---|---|---|---|---|---|---|---|
| $\Delta t_1$ | 1 | 0 | 1 | 0 | 0 | 0 | 0 | 0 |
| $\Delta t_2$ | 1 | 0 | 0 | 0 | 0 | 1 | 1 × N | 1 |
| $\Delta t_3$ | 1 | 1 | 0 | 0 | 1 | 1 | 2 × N | 2 |
| $\Delta t_4$ | 0 | 1 | 0 | 1 | 1 | 1 | 3 × N | 3 |
| $\Delta t_5$ | 0 | 1 | 1 | 1 | 1 | 0 | 4 × N | 4 |
| $\Delta t_6$ | 0 | 0 | 1 | 1 | 0 | 0 | 5 × N | 5 |

It appears that if the rotor position is initially at $\Delta t_2$, the local oscillator will have to add N pulses in order to bring initial counting within the time interval $\Delta t_1$ of position signal A. If instead, where the motor is stopped the position transducer encoder translates the sixth time interval $\Delta t_6$, then, ABC=001 and ($J_1$, $J_2$, $J_3$)=100. According to the table of truth, five time N pulses are now required to advance counting to $\Delta t_1$ so that initiation of the ramp logic of counter 9 corresponds with the occurrence of SYNC 2 on line 11 therefrom, e.g., coincides with the transition of position signal A.

Initialization is provided by presetting counter 9 in accordance with the logical combination of solid-state devices 51 and 52 once the digital value of $J_1$, $J_2$, $J_3$ has been stored into device 52.

Figure 7:
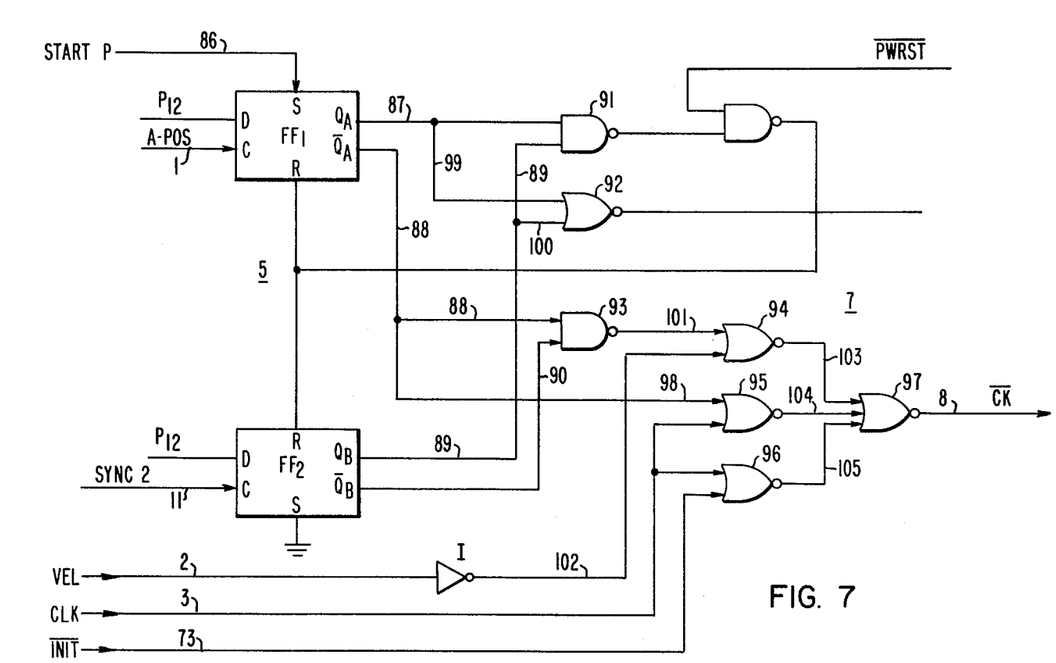

$J_1$, $J_2$, $J_3$ are set by the microprocessor (not shown) when a command to initialize (when the motor is not running) has been inputted by lines 81, 82, NAND device 83, line 85, inverter I and lines 86, 87 into pin 10 of device 52. At the same time, the phase detector 5 is disabled by line 86, so that flip-flop $FF_1$ does not respond to signal A of line 1 and flip-flop $FF_2$ does not respond to signal SYNC 2 of line 11 (FIG. 7). At the same time, by line 84, the microprocessor command START causes NAND device 75, line 76, NAND device 68 and line 69 to establish via line 71 and NAND device 72 a ZERO for signal $\overline{INIT}$ on lines 73 and 74. As a result, by line 74, a clocking of device 51 from the local oscillator is reset. At the same time signal $\overline{INIT}$ on line 73 causes NOR device 96 to allow, the local oscillator to clock counter 9 (FIG. 7) via line 105, NOR device 97 and line 8. SYNC 2 appears at line 65 of FIG. 6 to indicate zero-count for counter 9. Then, lines 65, 66, 56 and 57 by NAND device 62, line 64, NAND device 68, NOR device 70 and line 71 make it permissive for the $\overline{Q_1}$, $\overline{Q_3}$ count of the Johnson type counter 52 to be passed on line 73 for every 64 pulses detected by $Q_6$ in device 51. If $J_1$, $J_2$, $J_3$ in the Table of Truth are 100, this means that five clock pulses on pin 14 of counter 52 are required until the initial zero count of counter 9 will have been shifted back from $\Delta t_6$ to $\Delta t_1$. At this moment, $\overline{Q_1}$ and $\overline{Q_3}$ are both ONE's. Such shift of the initial count of counter 9, or presetting thereof, is obtained by $\overline{INIT}$ upon each step of 64 pulses, allowing (FIG. 7), via line 73, counts from line 3 to pass to NOR device 96 by line 105 and NOR device 97 onto line 8. When this has occurred five times, and $\overline{Q_1}$ and $\overline{Q_3}$ are both ONE's, lines 58 and 59 into NAND device 61 cause line 63 to go to ZERO. Then, $\overline{INIT}$ is back to ONE which resets by line 74 the divide counter 51 (FIG. 6) and by line 73 blocks NOR device 96 which inhibits any more counts from line 3 (FIG. 7). The number of pulses so accumulated by counter 9 define the preset state. SYNC 2 should now occur within time interval $\Delta t_1$, which still may be within 60° from actual synchronization.

The microprocessor knows by line 106 due to SYNC 2 on line 65, both ONE's on lines 56, 57, NAND device 68, line 77 and NAND device 75, that the signal of line 84 has been successful in initializing counter 9 by the required number of preset steps. Control on lines 81, 82 from the microprocessor will now command the synchronization process. The motor starts running. This is indicated by line 86. The phase detector is set, e.g., flip-flop $FF_1$ will now respond to signal A on line 1, and flip-flop $FF_2$ will be responsive to the now incoming velocity signal of line 2.

If the transition of signal A occurs first, $Q_A$ is a ONE and $Q_B$ is ZERO. This means that the encoder is ahead of SYNC 2. Then, $\overline{Q_A}$ by line 98 will cause NOR device 95 to pass pulses from the local oscillator, on line 3, onto counter 9, these pulses will be added to counting by counter 9 of the velocity signal pulses of line 2. Should, however, SYNC 2 occur before the transition of signal A, then $Q_A$ is a ZERO when $Q_B$ is a ONE. In such case, $\overline{Q_A}$ by line 88 will cause NAND device 93 and line 103, to prevent NOR device 94 from allowing the velocity signal of line 102 to reach NOR device 97 and line 8. Thus, the count of the velocity pulses of line 2 is inhibited. Adding pulses from line 3, or inhibiting a count of velocity pulses from line 2, will compensate for the error of synchronism between signal A of line 1 and SYNC 2 of line 11 at the input of the phase detector. When there is synchronism, $Q_A$ and $Q_B$ are the same. Neither does NOR device 95 allow pulses to be added, nor is counting of velocity pulses of line 2 inhibited by NOR device 94. The velocity signal being inherently synchronized with the SYNC 2 signal, the system remains synchronized at all speeds.

I claim:

1. A variable speed synchronous motor drive system including a current-fed inverter having thyristors controlled to be turned ON under natural commutation by a variable frequency AC power voltage, comprising:
   transducer means coupled to the rotor for providing a signal indicative of rotor position relative to the stator of the motor;
   means associated with said rotor for deriving an actual velocity signal characteristic of motor speed;
   counter means controlled by said velocity signal deriving means and locked with said transducer means for generating a time wave reference;
   a comparator for establishing with said time wave reference and a voltage reference signal a firing angle;
   a gate pulse generator responsive to said comparator for selectively applying a firing pulse to a thyristor "next" to be turned ON in a sequential order of said thyristors.

2. The synchronous motor drive system of claim 1 with means responsive to said counter means and to said position signal for locking said counter means with said transducer means when the motor rotates.

3. The synchronous motor drive of claim 2 with said locking means including phase detector means for detecting a phase error between said time wave and said position signal; means responsive to said phase error and operative on said counter means for shifting said time wave reference to compensate for said phase error.

4. The synchronous motor drive of claim 3 with said phase error responsive means comprising means for inhibiting said velocity signal from being applied to said counter means when said phase error represents an advance of said time wave reference, and local oscillator means for adding pulses to said counter means when said phase error represent a retard of said time wave reference relative to said position signal.

5. The synchronous motor drive of claim 2 with said transducer means providing a plurality of successive digital states characterizing successive equal time intervals dividing a full cycle of the fundamental sine wave of said AC power line with local oscillator means providing initially a fictive velocity signal applied to said counter means when the motor is not running;
   with counter presetting means connected to said counter means for initializing said counter means in relation to a reference digital state in accordance with the one of said digital state established by said transducer means when the motor is not running, whereby the operation of said counter means is initiated by said actual velocity signal in concordance with said reference digital state.

6. A method of synchronizing the time wave reference simulating the power supply naturally commutating the thyristors of a thyristor-controlled synchronous motor drive with the actual fundamental wave of the power supply comprising the steps of: establishing in relation to rotor positions a succession of digital states characterizing successive phase relationships of the phase lines of the motor as if the motor were running; simulating with a local oscillator generating a first series of pulses a fictive velocity signal as if the motor were running at said fictive velocity; reading an initial one of said successive digital states corresponding to a present position of said rotor when the motor is not running; presetting an initial count defined by said initial digital state; deriving from the rotor a series of pulses indicative of the speed of the motor when the motor is running and synchronously scanning through said successive states to indicate zero crossings of the fundamental sine wave related to a thyristor next to be fired; recurrently counting pulses of said speed indicative series of pulses from said initial count; detecting a phase error between the occurrence of said zero-crossing and each recurrent counting of said speed indicative series of pulses; modifying said recurrent counting to compensate for said phase error, thereby to synchronize recurrent counting with said fundamental sine wave; and controlling the firing of the thyristors in succession by reference to modified recurrent counting.

7. A synchronous motor drive system having a synchronous motor, a current-fed and thyristor-controlled inverter for supplying to said motor AC current in accordance with a fundamental AC sinewave of adjustable frequency; digital counter means for recurrently generating a first series of digital signals as a function of time from a zero-count reference; and means responsive to said digital counter means for selectively firing the thyristors at a frequency related to the occurrence of said zero-count reference and with a retardation angle defined by a selected one of said digital signals of said first series; comprising:
   first means coupled to the rotor of the motor for providing as a function of rotor angular position a second series of digital signals counted from zero-crossing of said fundamental sinewave;
   second means coupled to the rotor of the motor for providing a third series of digital signals representing the speed of the motor when running;
   third means responsive to the occurrence of a zero-count by said digital counter means for presetting said counter means in accordance with one of said signals of said second series as derived from said first means when the motor is not running to establish an initial count for said digital counter means;

said counter means being initiated to derive said first series of digital signals in response to said third series of digital signals from said initial count upon the occurrence of said zero-count when the motor is running, whereby said zero-count occurs in synchronism with the occurrence of said zero-crossing.

8. The synchronous motor drive system of claim 7 with said third means including a local oscillator for providing a fourth series of pulses, said digital counter means being triggered by said local oscillator when the motor is not running to shift said digital counter means in accordance with said one of said signal of said second series to provide said initial count.

9. The synchronous motor drive system of claim 8 with said first means providing a signal indicative of the occurrence of said zero-crossing of said fundamental sinewave when the motor is running;

with phase detector means responsive to said zero-crossing indicative signal and to said zero-count occurrence by said digital counter means for providing an error signal when the motor is running;

means being provided responsive to said error signal for adding pulses from said local oscillator to said counter means while said counter means counts digital signals from said third series when said error is of one polarity, and for inhibiting digital signals from said third series to said counter means when said error is of the opposite polarity, thereby to minimize said error and to bring synchronism between the occurrence of said zero-count and said zero-crossing.

* * * * *